(12) United States Patent
Betschart et al.

(10) Patent No.: US 11,434,930 B2
(45) Date of Patent: Sep. 6, 2022

(54) SEALING SYSTEM, TURBOMACHINE WITH A SEALING SYSTEM AND METHOD FOR CLEANING THE SAME

(71) Applicant: MAN Diesel & Turbo SE, Augsburg (DE)

(72) Inventors: Michael Betschart, Vitznau (CH); Simon Fischer, Oeschgen (CH); Marcel Rosenberger, Stallikon (CH); Roger Suter, Zürich (CH)

(73) Assignees: MAN ENERGY SOLUTIONS SE, Augsburg (DE); EAGLEBURGMANN GERMANY GMBH & CO. KG, Wolfratshausen (DE)

( * ) Notice: Subject to any disclaimer, the term of this patent is extended or adjusted under 35 U.S.C. 154(b) by 172 days.

(21) Appl. No.: 15/970,625

(22) Filed: May 3, 2018

(65) Prior Publication Data
US 2018/0320710 A1 Nov. 8, 2018

(30) Foreign Application Priority Data
May 5, 2017 (DE) .......................... 102017109663.9

(51) Int. Cl.
*F04D 29/12* (2006.01)
*F01D 11/10* (2006.01)
(Continued)

(52) U.S. Cl.
CPC ............ *F04D 29/705* (2013.01); *F01D 11/04* (2013.01); *F01D 11/10* (2013.01); *F01D 25/002* (2013.01);
(Continued)

(58) Field of Classification Search
CPC .... F04D 29/705; F04D 29/124; F04D 29/083; F04D 29/161; F04D 29/582;
(Continued)

(56) References Cited

U.S. PATENT DOCUMENTS 4,294,453 A 10/1981 Inouye et al.
5,492,341 A * 2/1996 Pecht ................... F16J 15/3412
277/400

(Continued)

FOREIGN PATENT DOCUMENTS

CA 2968755 5/2014
CN 201137598 Y 10/2008
(Continued)

OTHER PUBLICATIONS

Office Action dated May 18, 2020 issued in Chinese Patent Application No. 201810419654.6.
(Continued)

*Primary Examiner* — Alexander Markoff
(74) *Attorney, Agent, or Firm* — Cozen O'Connor

(57) ABSTRACT

A sealing system of a turbomachine for sealing a rotor of the turbomachine relative to a stator of the turbomachine, having a rotor-side component rotating together with the rotor, a stator-side component that is stationary together with the stator, and a dry gas seal, which includes a rotor-side sealing component and a stator-side sealing component compressed via a spring element forming a sealing gap, and a cleaning device, via which detergent is conducted in the direction of the spring element for cleaning the same and/or in the direction of the sealing gap for cleaning the same.

18 Claims, 1 Drawing Sheet

(51) Int. Cl.
- *F01D 11/04* (2006.01)
- *F01D 25/00* (2006.01)
- *F04D 29/70* (2006.01)
- *F16J 15/34* (2006.01)

(52) U.S. Cl.
CPC ........ *F04D 29/124* (2013.01); *F16J 15/3404* (2013.01); *F05D 2220/40* (2013.01); *F05D 2260/607* (2013.01)

(58) Field of Classification Search
CPC ....... F16J 15/3404; F01D 11/04; F01D 11/10; F01D 25/002; F01D 25/10; F05D 2220/40; F05D 2260/607
See application file for complete search history.

(56) References Cited

U.S. PATENT DOCUMENTS

| | | | | |
|---|---|---|---|---|
| 5,529,315 | A * | 6/1996 | Borrino | F16J 15/3484 277/352 |
| 6,276,692 | B1 * | 8/2001 | Beeck | F01D 11/04 277/411 |
| 2003/0042683 | A1 * | 3/2003 | Takahashi | F16J 15/3404 277/370 |
| 2007/0147983 | A1 | 6/2007 | Yokoyama et al. | |
| 2008/0093806 | A1 * | 4/2008 | Takahashi | F16J 15/3404 277/375 |
| 2009/0200749 | A1 * | 8/2009 | Teshima | F16J 15/3404 277/512 |
| 2009/0290971 | A1 * | 11/2009 | Shamseldin | G01M 3/002 415/1 |
| 2011/0198813 | A1 * | 8/2011 | Takahashi | F16J 15/3464 277/387 |
| 2014/0030063 | A1 * | 1/2014 | Mateman | F16J 15/40 415/110 |
| 2015/0197712 | A1 * | 7/2015 | Ekanayake | C11D 7/34 427/299 |
| 2016/0024953 | A1 * | 1/2016 | Mischo | F01D 11/04 415/170.1 |
| 2017/0314409 | A1 * | 11/2017 | Erdmenger | F01D 11/025 |
| 2018/0298775 | A1 * | 10/2018 | Suter | F01D 25/002 |

FOREIGN PATENT DOCUMENTS

| | | | |
|---|---|---|---|
| CN | 103925233 | 7/2014 | |
| CN | 203978859 U | 12/2014 | |
| CN | 105351244 | 2/2016 | |
| DE | 3012711 | 10/1980 | |
| DE | 10236471 | 5/2003 | |
| DE | 102015013659 | 4/2017 | |
| EP | 2 977 563 | 1/2016 | |
| JP | S 55-132465 | 10/1980 | |
| JP | 2003-269391 | 9/2003 | |
| JP | 2011-522175 | 7/2011 | |
| JP | 2014-020425 | 2/2014 | |
| WO | WO 2006/022378 | 3/2006 | |
| WO | WO 2008/013147 | 1/2008 | |
| WO | WO-2016030845 A1 * | 3/2016 | ............. F01D 11/04 |
| WO | WO 2016/207761 | 12/2016 | |
| WO | WO-2017068073 A1 * | 4/2017 | ............. F01D 11/04 |

OTHER PUBLICATIONS

Office Action dated Sep. 27, 2021 issued in Japanese Patent Application No. 2018-088740.

* cited by examiner

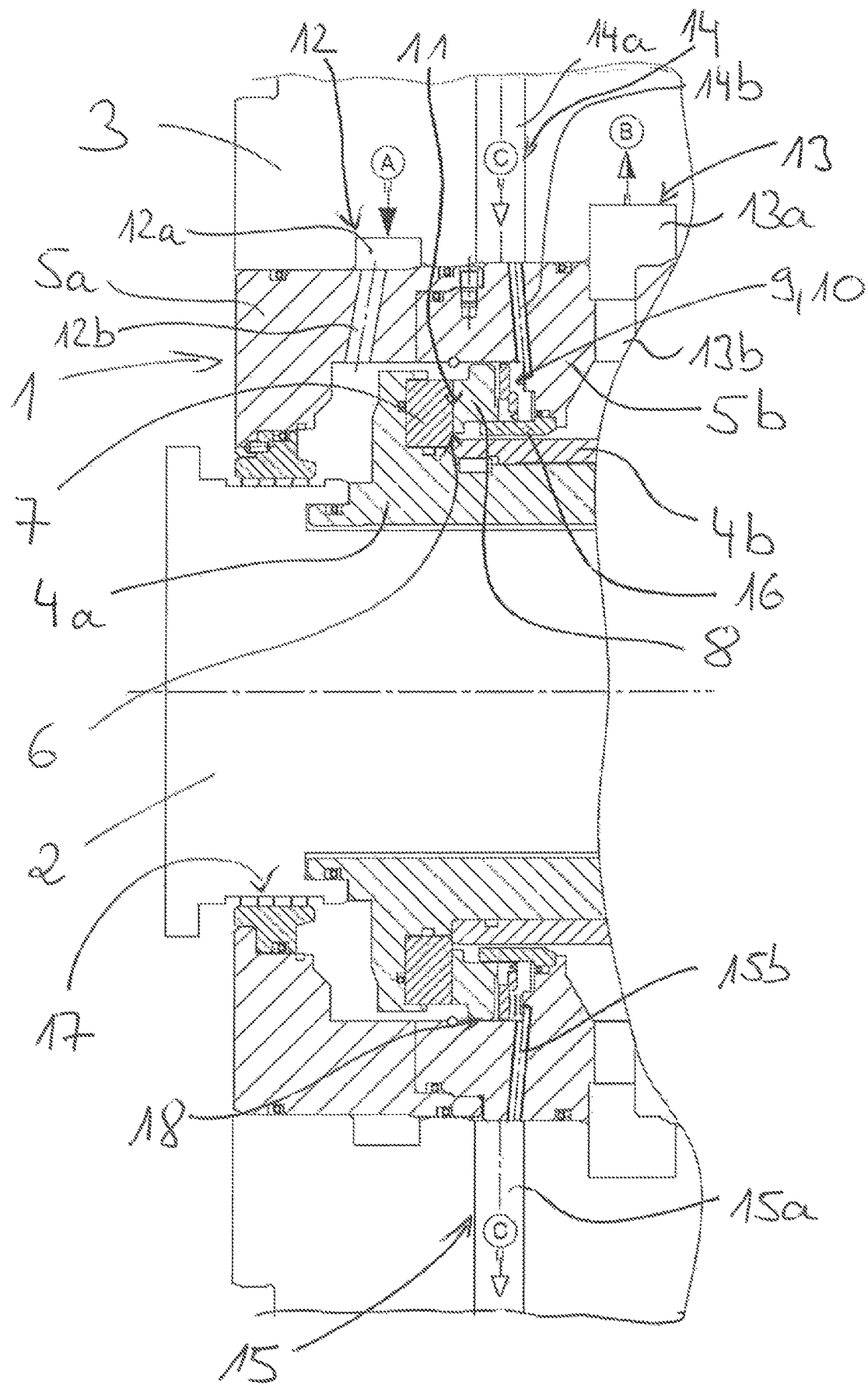

SEALING SYSTEM, TURBOMACHINE WITH A SEALING SYSTEM AND METHOD FOR CLEANING THE SAME

BACKGROUND OF THE INVENTION

1. Field of the Invention

The invention relates to a sealing system for a turbomachine. The invention, furthermore, relates to a turbomachine with such a sealing system and to a method for cleaning the sealing system.

2. Description of the Related Art

In turbomachines, such as for example turbocompressors, dry gas seals are employed for sealing a rotor of the turbomachine relative to a stator of the turbomachine.

Accordingly, from EP 2 977 563 A1 a dry seal of a turbomachine is known. Sealing gas can be fed to a sealing gap to be sealed via a bore in the stator and via a gas space that is provided by the dry gas seal.

Dry gas seals can fail by becoming dirty. Such dirt is introduced, for example, by way of foreign matter contained in the sealing gas and/or process gas. The dirt can form from condensing gases, condensing solids, or other foreign particles deposited in the region of the dry gas seal and lead to a failure of the dry gas seal. This is a disadvantage.

SUMMARY OF THE INVENTION

One aspect of the present invention is based on providing a sealing system with a dry gas seal with which the risk of a dirt-induced failure is reduced. The invention, furthermore, is based on the object of providing a turbomachine and a method for cleaning the sealing system.

The sealing system according to one aspect of the invention comprises a cleaning device with detergent that can be conducted in the direction of a spring element for cleaning the same and/or in the direction of the sealing gap for cleaning the same.

With the invention, a sealing system of a turbomachine with a dry gas seal is proposed for the first time that comprises a cleaning device, via which detergent for cleaning the dry gas seal is provided, namely for the spring element or a spring space receiving the spring element and/or for cleaning the sealing gap of the dry gas seal. Because of the cleaning, there is less risk that the sealing system will suffer a dirt-induced failure.

According to an advantageous further development, at least one sealing gas feeding duct and at least one sealing gas discharge duct are introduced into the stator and into a first stator-side component that is stationary together with the stator to conduct sealing gas via the sealing gas feeding duct in the direction of the sealing gap of the dry gas seal and via the sealing gas discharge duct and conduct sealing gas away from the sealing gap of the dry gas seal. Preferentially, a radially outer section of the sealing gas feeding duct is introduced into the stator and multiple radially inner sections of the sealing gas feeding duct into the adjoining stator-side component, wherein preferentially between the stator and the adjoining stator-side component a first annular gap connecting these sections is formed. By way of this, the sealing gas can be particularly advantageously conducted within the sealing system.

According to an advantageous further development, at least one detergent feeding duct and at least one detergent discharge duct are introduced into the stator and via the detergent feeding duct conduct detergent in the direction of the spring element and via the detergent discharge duct, detergent away from the spring element. Preferentially, a radially outer section of the detergent feeding duct is introduced into the stator and in the adjoining stator-side component a radially inner section of the detergent feeding duct. Preferentially, detergent can also be conducted via the detergent feeding duct in the direction of the sealing gap and via the sealing gas discharge duct away from the sealing gap. Because of this, the detergent can be conducted particularly advantageously within the sealing system.

According to an advantageous further development, the sealing gas feeding duct and the sealing gas discharge duct are spaced in the axial direction and preferentially in the same circumferential position. The detergent feeding duct and the detergent discharge duct are formed spaced in the circumferential direction and preferentially in the same axial position. The detergent feeding duct is formed in the axial direction between the sealing gas feeding duct and the sealing gas discharge duct and preferentially in circumferential position. This further development allows a particularly advantageous, functionally optimal and installation space-saving integration of the feeding ducts for sealing gas and detergent in the sealing system.

According to an advantageous further development, the sealing system comprises a detergent dosing system, via which the detergent is fed to the detergent feeding duct with a defined detergent pressure. By providing the defined detergent pressure, an optimal cleaning result of the dry gas seal can be ensured.

Preferentially, the sealing system, in particular the detergent dosing system, comprises a heating device for heating the detergent. By heating the detergent, the sealing system can be heated which is advantageous in particular when the cleaning of the sealing system takes place with the turbomachine stationary.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. It shows:

The FIGURE is a schematic axial section through a turbomachine in the region of a sealing system.

DETAILED DESCRIPTION OF THE PRESENTLY PREFERRED EMBODIMENTS

The invention relates to a sealing system of a turbomachine, in particular of a turbocompressor for compressing a process gas, and to a turbomachine with a sealing system.

The FIGURE shows an extract from a turbomachine in the region of a sealing system 1, which serves for sealing a rotor 2 of the turbomachine relative to a stator 3 of the turbomachine. Between the rotor 2 and the stator 3 the sealing system 1 is positioned. The sealing system 1 comprises at least one rotor-side component 4a, 4b rotating with the rotor 2 and at least one stator-side component 5a, 5b that is stationary together with the stator 3.

The sealing system 1 comprises at least one dry gas seal 6. The dry gas seal 6 comprises a rotor-side sealing component 7 and a stator-side sealing component 8, which are compressed in the axial direction via a spring element 9 received in a stator-side spring space 10 and which pushes against the stator-side sealing element 8. Between these compressed sealing components 7, 8 of the dry gas seal 6 a sealing gap 11 is formed. The rotor-side sealing component 7 of the dry gas seal 6 is fastened to the rotor-side component 4a of the sealing system 1. A stator-side guide element 16 guides the stator-side sealing element 8. Between the stator-side component 5a an optional labyrinth seal 17 is formed in the shown exemplary embodiment.

At least one sealing gas feeding duct 12 and at least one sealing gas discharge duct 13 are introduced into the stator 3 and into at least one stator-side component that is stationary together with the stator 3.

In the preferred exemplary embodiment shown in the FIGURE, the exhaust gas feeding duct 12 is formed by multiple sections, namely by a radially outer section 12a, which is introduced into the stator 3, and multiple radially inner sections 12b, which are introduced into the adjoining stator-side component 5a, wherein preferentially between the stator 3 and this adjoining stator-side component 5a an annular gap is formed, via which the section 12a is coupled to the sections 12b. The sealing gas discharge duct 13 is formed analogously, wherein the sealing gas discharge duct 13 comprises a radially outer section 13a, which is introduced into the stator 3, and multiple radially inner sections 13b, which are introduced into the adjoining stator-side component 5b. Between the stator 3 and the adjoining stator-side component 5b an annular gap is preferentially formed, via which the radially inner sections 13b of the sealing gas outflow duct 13 are connected to the radially outer section 13a of the same.

By way of the sealing gas feeding duct 12, the sealing gas can be conducted in the direction of the sealing gap 11 to be sealed, wherein the sealing gas downstream of this sealing gap can be discharged from the sealing gap 11 via the sealing gas discharge duct 13.

The flow arrow A visualises the feeding of the sealing gas (see black arrowhead) via the sealing gas feeding duct 12.

The sealing system 1 according to the invention comprises a cleaning device via which preferentially liquid detergent can be conducted in the direction of the spring element 9 or the spring element 10 receiving the spring element 9 and/or in the direction of the sealing gap 11 in order to clean the sealing system 11 in the region of the spring element 9 and/or of the sealing gap 11 thus discharging dirt from the same so that the risk of the dirt-induced failure of the dry gas seal 6 of the sealing system 1 is reduced.

This cleaning device comprises a detergent feeding duct 14 and a detergent discharge duct 15. The detergent feeding duct 14 and preferentially also the detergent discharge duct 15 are introduced into the stator 3 and into a stator-side component 5b adjoining the stator 3 that is stationary together with the stator 3. By way of the detergent feeding duct 14, detergent can be conducted in the direction of the spring element 9 or the spring space 10 and preferentially also conducted to the sealing gap 11 originating from the spring space 10 via a gap 18 between the stator-side sealing component 8 and the stator-side component 5b, wherein liquid detergent, which cleans the spring space 10, is discharged from the spring space 10 via the detergent discharge duct 15, and wherein detergent, which enters the region of the sealing gap 11, can be discharged via the sealing gas discharge duct 13. The detergent distributes itself in the spring space 10 over the entire circumference of the same.

The flow arrow C illustrates the conduction of the detergent (see white arrowhead), which originating from the detergent feeding duct 14 flows via the spring space 10 in the direction of the detergent discharge duct 15.

A flow arrow B visualises the flow of the detergent and of the sealing gas (see black/white arrowhead) originating from the sealing gap 11 into the region of the sealing gas outflow duct 13.

The sealing gas feeding duct 12 is axially spaced from the sealing gas discharge duct 13, but the same are preferentially formed in the same circumferential position. The detergent feeding duct 14 and the detergent feeding duct 14 and the detergent discharge duct 15, seen in the circumferential direction, are offset relative to one another and in the axial direction preferentially formed in the same axial position. The FIGURE shows that the detergent feeding duct 14 seen in the axial direction is formed between the sealing gas feeding duct 12 and the sealing gas discharge duct 13 and preferentially together with the same in the same circumferential position.

The detergent feeding duct 14 is formed by a radially outer section 14a, which is introduced into the stator 3, and by at least one radially inner section 14b, which is introduced into the stator-side component 5b. Likewise, this stator-side component 5b provides the detergent discharge duct 15, namely at least one radially inner section 15b of the same, wherein a radially outer section 15a of the detergent discharge duct 15 in turn is provided by the stator 3.

With the embodiment of the sealing system 1 described above, both the sealing gas and also the liquid detergent can be optimally conducted, namely with optimal installation space utilisation.

The sealing system 1, furthermore, comprises a detergent dosing system which is not shown, via which the detergent can be provided to the detergent feeding duct 14. Here it is possible that the detergent dosing system comprises a detergent tank in which the detergent is provided, wherein a separate pressure vessel can be conducted to the detergent tank, which pressurises the detergent in the detergent reservoir providing the same to the detergent feed line 14 with a defined detergent pressure.

It is likewise possible to integrate the function of detergent reservoir and compressed-air receiver in one vessel and provide detergent pressurised in the pressure-medium receiver and then feed the same originating from the pressure-medium vessel to the detergent feed line 14 with a defined detergent pressure.

Detergent, originating from the detergent reservoir, can also be provided to the detergent feed line 14 via a pump, the delivery pressure of which then determines the detergent pressure.

Preferentially, the sealing system comprises the detergent dosing system and a heating system for heating the detergent before feeding the same in the direction of the sealing system 1.

A turbomachine, which comprises the sealing system 1 comprised above, is preferentially cleaned in the stationary state of the turbomachine with the help of the detergent so that the detergent is then fed to the sealing system 1, namely the dry gas seal 6 exclusively in the stationary state of the turbomachine. In this case, heating the detergent is advantageous in order to heat the sealing system 1, namely the dry gas seal 6, with stationary turbomachine and prevent a process gas condensation during the stationary state, i.e. during the cleaning.

However it is also possible to clean the sealing system 1 with running turbomachine, wherein with running turbomachine sealing gas and detergent is then simultaneously conducted in the direction of the sealing system 1.

The pressure level of the detergent is obviously designed depending on whether the cleaning of the sealing system 1 is conducted with stationary or running turbomachine.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sealing system of a turbomachine configured to seal a rotor of the turbomachine relative to a stator of the turbomachine, having a rotor-side component rotating together with the rotor and at least one stator-side component that is stationary together with the stator, comprising:
    at least one dry gas seal, which comprises:
        a rotor-side sealing component;
        a stator-side sealing component, wherein a sealing gap is formed between the rotor-side sealing component and the stator-side sealing component;
        a spring element configured to compress the rotor-side sealing component and the stator-side sealing component forming sealing gap; and
        a cleaning device comprising a detergent feeding duct arranged in part in the stator and the at least one-stator-side component of the turbomachine and configured to conduct detergent in a direction of the spring element for cleaning the spring element;
        a detergent discharge duct arranged in the stator-side component that is stationary together with the stator and configured to conduct detergent away from the spring element; and
        a sealing gas feeding duct configured to conduct sealing gas in the direction of the sealing gap;
        wherein radially inner section of the detergent feeding duct is arranged radially outward of the spring element to discharge the detergent into a spring space of the spring element, and
        wherein the detergent feeding duct is axially spaced apart from the sealing gas feeding duct.

2. The sealing system according to claim 1, further comprising:
    a sealing gas discharge duct configured to conduct the sealing gas away from the sealing gap,
    wherein the sealing gas feeding duct and the sealing gas discharge duct are provided in the stator and into the at least one stator-side component that is stationary together with the stator.

3. The sealing system according to claim 2, further comprising:
    a radially outer section of the sealing gas feeding duct arranged in the stator;
    multiple radially inner sections of the sealing gas feeding duct are arranged in the stator-side component; and
    a first annular gap connecting the radially outer section and a radially inner section formed between the stator and the stator-side component.

4. The sealing system according to claim 3, further comprising:
    a radially outer section of the sealing gas discharge duct arranged in the stator;
    multiple radially inner sections of the sealing gas discharge duct are arranged in the stator-side component; and
    an annular gap connecting the radially outer section and the multiple radially inner sections formed between the stator and the stator-side component.

5. The sealing system according to claim 4, wherein the detergent feeding duct is introduced into the stator-side component that is stationary together with the stator and configured to conduct detergent to the spring element.

6. The sealing system according to claim 5, wherein a radially outer section of the detergent feeding duct and of the detergent discharge duct are introduced into the stator, and
    the radially inner section of the detergent feeding duct and a radially inner section of the detergent discharge duct are introduced into the stator.

7. The sealing system according to claim 6, wherein detergent feeding duct is configured to conduct the detergent in the direction of the sealing gap and via the sealing gas discharge duct away from the sealing gap.

8. The sealing system according to claim 7, wherein the sealing gas feeding duct and the sealing gas discharge duct are formed spaced apart from one another in an axial direction and at a same circumferential position with respect to an axis of rotation of the rotor.

9. The sealing system according to claim 8, wherein the detergent feeding duct and the detergent discharge duct are formed spaced apart from one another in a circumferential direction and at a same axial position.

10. The sealing system according to claim 9, wherein the detergent feeding duct is formed in the axial direction between the sealing gas feeding duct and the sealing gas discharge duct and in the same circumferential position as the sealing gas feeding duct and the sealing gas discharge duct.

11. The sealing system according to claim 5, wherein the detergent feeding duct receives the detergent from a detergent dosing system at a defined detergent pressure.

12. The sealing system according to claim 1, further comprising:
    a heating device configured to heat detergent utilized for cleaning the dry gas seal.

13. A turbomachine for compressing a process gas with an integrated cleaning device, comprising:
    a stator having a stator-side component;
    a rotor, and
    a sealing system comprising at least one dry gas seal, which comprises:

a rotor-side sealing component;
a stator-side sealing component, wherein a sealing gap is formed between the rotor-side sealing component and the stator-side sealing component;
a spring element configured to compress the rotor-side sealing component and the stator-side sealing component forming the sealing gap; and
the integrated cleaning device comprising a detergent feeding duct arranged in part in the stator and stator-side component of the turbomachine and configured to conduct detergent in a direction of the spring element for cleaning the spring element; and
a detergent discharge duct arranged in the stator-side component that is stationary together with the stator and configured to conduct detergent away from the spring element; and
a sealing gas feeding duct configured to conduct sealing gas in the direction of the sealing gap,
wherein radially inner section of the detergent feeding duct is arranged radially outward of the spring element to discharge the detergent into a spring space of the spring element, and
wherein the detergent feeding duct is axially spaced apart from the sealing gas feeding duct.

14. The sealing system according to claim 1, wherein the cleaning device conducts the detergent during a running of the turbomachine.

15. The sealing system according to claim 1, wherein at least one sealing gas feeding duct of the cleaning device is integrated into the stator.

16. The sealing system according to claim 1, wherein at least one sealing gas discharge duct of the cleaning device is integrated into the stator.

17. The turbomachine for compressing a process gas with an integrated cleaning device, according to claim 13, wherein the detergent feeding duct and the detergent discharge duct are offset relative to one another in a circumferential direction and formed in a same axial position.

18. The turbomachine for compressing a process gas with an integrated cleaning device, according to claim 17, wherein the detergent feeding duct, seen in the axial direction is formed between a sealing gas feeding duct and a sealing gas discharge duct.

* * * * *